Dec. 5, 1961  H. W. WELSH  3,011,522
VALVE
Filed March 21, 1960

INVENTOR.
Harvey W. Welsh
BY
Bryce Beecher
ATTORNEY

United States Patent Office 3,011,522
Patented Dec. 5, 1961

3,011,522
VALVE
Harvey W. Welsh, Indianapolis, Ind., assignor to General Motors Corporation, Detroit, Mich., a corporation of Delaware
Filed Mar. 21, 1960, Ser. No. 16,605
2 Claims. (Cl. 137—625.46)

This invention relates to a valve construction of novel design.

In piston engines of the type operated by rocket-type propellants, i.e., by gases at high temperatures and pressures, the control valving through which the cylinders housing the reciprocating pistons are sequentially charged with the gas presents a substantial problem. Thus, using valves of conventional design incorporating rubbing seals, it has been found difficult to prevent undue leakage of the propellant gas into the cylinders when the same are exhausting.

The invention has as a principal object to provide a valve construction suited for the purpose indicated which dispenses with the need for rubbing seals. Other objects and features of the invention will be apparent from the following description which will proceed with reference to the accompanying drawings illustrating a preferred embodiment and wherein.

Figure 1:
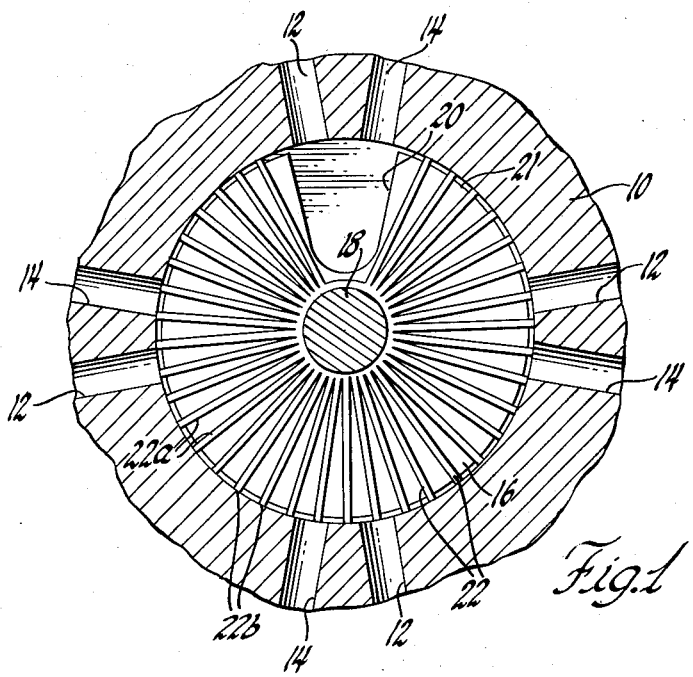
FIGURE 1 is a fragmentary sectional view of the valve with the moving component shown for the most part in elevation.
Figure 2:
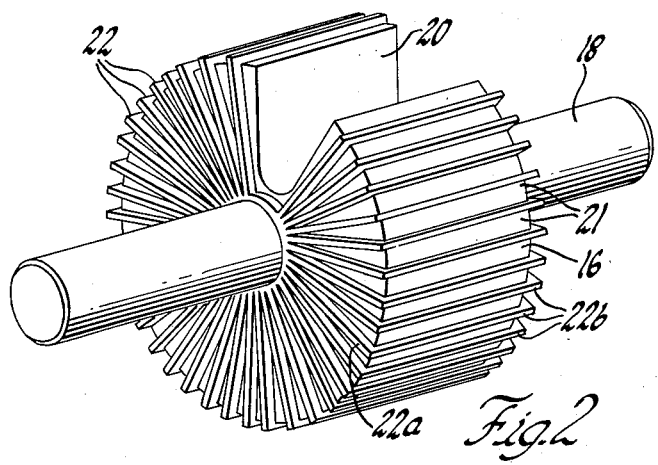
FIGURE 2 is a perspective view of the moving component including the shaft through which it is actuated.

In FIGURE 1, the numeral 10 denotes the valve housing which will be seen provided with a plurality of pairs of ports 12, 14. Port 12 in each case receives propellant gas for charging through the companion part 14 to one of the cylinders of the engine served by the valve.

Housing 10 confines a rotary spool member 16 shown as having an integral actuating shaft 18. With the valve installed, the shaft 18 has operable connection with means whereby the spool 16 is rotated in timed sequence to properly charge the engine cylinders with propellant gas. Ports 12, with the valve installed, connect with a passage common thereto extending from the gas source.

Spool 16 will be noted as provided with a V-notch 20 operating to interconnect the ports of each pair of ports when the notch is brought into the required juxtaposition.

To prevent or mitigate leakage between the port pairs, spool 16 has therein a plurality of grooves 21 providing fins 22, each of which comprises radial portions 22a and a peripheral portion 22b. These fins achieve their purpose through interruption of the leakage flow between the port pairs. Thus, before leakage into an exhausting cylinder can take place, each groove in the path of the leakage gas must become filled therewith and the gas in the groove next to the opening to the cylinder must attain a pressure sufficient to enable it to pass the sliding fit between the intervening fin and the wall of the housing. In practice, it is found that such leakage as occurs does not appreciably adversely affect the operation of the engine.

I claim:

1. A valve construction including a housing member having end portions and provided with a plurality of pairs of radial ports in spaced relation, these ports being located in the body portion of the housing member mediate said end portions, a member rotatable within said housing member having a notch therein whereby the ports of each pair of ports may be interconnected, said rotatable member being of cylindrical shape and being provided with spaced fins serving to mitigate leakage between said pairs of ports, and an actuating shaft coaxial with said rotatable member, each of said fins comprising portions extending radially from the axis of said rotatable member and a peripheral portion interconnecting said radial portions.

2. A valve construction including a first member having end portions and provided with a plurality of pairs of radial ports in spaced relation, these ports being located in the body portion of the said member mediate said end portions, a second member within said first member having a notch therein whereby the ports of each pair of ports may be interconnected on rotation of one of said members relative to the other, said second member being of cylindrical shape and being provided with spaced fins serving to mitigate leakage between said pairs of ports, each of said fins comprising portions extending radially from the axis of said second member and a peripheral portion interconnecting said radial portions.

References Cited in the file of this patent
UNITED STATES PATENTS

| | | |
|---|---|---|
| 1,042,634 | Wood | Oct. 29, 1912 |
| 1,228,469 | Mueller | June 5, 1917 |
| 1,846,865 | Hapgood | Feb. 23, 1932 |
| 2,045,113 | Ward | June 23, 1936 |